(12) United States Patent
Liu et al.

(10) Patent No.: US 12,136,364 B2
(45) Date of Patent: Nov. 5, 2024

(54) FLEXIBLE DISPLAY DEVICE

(71) Applicant: BOE Technology Group Co., Ltd., Beijing (CN)

(72) Inventors: Junhuan Liu, Beijing (CN); Hong Zhu, Beijing (CN); Shangchieh Chu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 262 days.

(21) Appl. No.: 17/771,889

(22) PCT Filed: May 13, 2021

(86) PCT No.: PCT/CN2021/093637
§ 371 (c)(1),
(2) Date: Apr. 26, 2022

(87) PCT Pub. No.: WO2021/254048
PCT Pub. Date: Dec. 23, 2021

(65) Prior Publication Data
US 2022/0415215 A1   Dec. 29, 2022

(30) Foreign Application Priority Data

Jun. 16, 2020   (CN) .......................... 202010549121.7

(51) Int. Cl.
*G09F 9/00* (2006.01)
*G06F 1/16* (2006.01)
*G09F 9/30* (2006.01)

(52) U.S. Cl.
CPC ............ *G09F 9/301* (2013.01); *G06F 1/1652* (2013.01)

(58) Field of Classification Search
CPC ............................... G09F 9/301; G06F 1/1652
(Continued)

(56) References Cited

U.S. PATENT DOCUMENTS 7,196,692 B2  3/2007  Mochizuki et al.
8,009,421 B2  8/2011  Misawa
(Continued)

FOREIGN PATENT DOCUMENTS

CA    1250429 A    2/1989
CN    2674521 Y    1/2005
(Continued)

OTHER PUBLICATIONS

International Search Report issued Aug. 17, 2021 in corresponding PCT Application No. PCT/CN2021/093637 (with English translation), 5 pages.
(Continued)

*Primary Examiner* — Zhengfu J Feng
(74) *Attorney, Agent, or Firm* — XSENSUS LLP (57) ABSTRACT

Disclosed is a flexible display device. The flexible display device includes a housing, a winding shaft, a flexible display panel, a supporting member, a separating member and a pressing member. The housing has an opening provided thereon. The winding shaft is rotatably provided in the housing. The flexible display panel has one end connected to the winding shaft and another opposite end extending out of the housing through the opening. The supporting member has one end connected to the winding shaft and another opposite end extending out of the housing through the opening. The separating member is provided on the housing to separate the flexible display panel and the supporting member partially. The pressing member is provided on the housing to connect the flexible display panel and the supporting member.

20 Claims, 3 Drawing Sheets

(58) Field of Classification Search
USPC .................................................. 361/679.01
See application file for complete search history.

(56) References Cited

U.S. PATENT DOCUMENTS

| | | | |
|---|---|---|---|
| 8,009,422 B2 | 8/2011 | Misawa | |
| 8,516,728 B2 | 8/2013 | Jung | |
| 8,576,555 B2 | 11/2013 | Misawa | |
| 9,733,672 B2 | 8/2017 | Kim et al. | |
| 9,870,029 B2 | 1/2018 | Kim et al. | |
| 2004/0061683 A1 | 4/2004 | Mochizuki et al. | |
| 2008/0055106 A1 | 3/2008 | Zhang | |
| 2008/0212271 A1* | 9/2008 | Misawa | G09F 9/35 361/679.01 |
| 2010/0182288 A1 | 7/2010 | Misawa | |
| 2011/0273826 A1 | 11/2011 | Misawa | |
| 2012/0204453 A1* | 8/2012 | Jung | G09F 9/301 40/517 |
| 2016/0187929 A1 | 6/2016 | Kim et al. | |
| 2016/0239050 A1* | 8/2016 | Kim | G06F 1/1652 |
| 2016/0324014 A1* | 11/2016 | Lee | H05K 1/028 |
| 2016/0381812 A1 | 12/2016 | Dong | |
| 2019/0098776 A1 | 3/2019 | Jeon | |

FOREIGN PATENT DOCUMENTS

| | | |
|---|---|---|
| CN | 103712052 A | 4/2014 |
| CN | 104683522 A | 6/2015 |
| CN | 104714699 A | 6/2015 |
| CN | 105741683 A | 7/2016 |
| CN | 105810845 A | 7/2016 |
| CN | 106128312 A | 11/2016 |
| CN | 205943347 U | 2/2017 |
| CN | 106505156 A | 3/2017 |
| CN | 106952581 A | 7/2017 |
| CN | 106981254 A | 7/2017 |
| CN | 107369383 A | 11/2017 |
| CN | 107408358 A | 11/2017 |
| CN | 107492309 A | 12/2017 |
| CN | 207517288 U | 6/2018 |
| CN | 208368047 U | 1/2019 |
| CN | 208805754 U | 4/2019 |
| CN | 109859635 A | 6/2019 |
| CN | 110211501 A | 9/2019 |
| CN | 110288914 A | 9/2019 |
| CN | 111161636 A | 5/2020 |
| CN | 107408358 B | 6/2020 |
| CN | 111833740 A | 10/2020 |
| JP | 2008157996 A | 7/2008 |
| KR | 20170019043 A | 2/2017 |
| KR | 102180801 B1 | 11/2020 |
| TW | 201234327 A | 8/2012 |
| TW | I539416 B | 6/2016 |
| WO | 2017113243 A1 | 7/2017 |

OTHER PUBLICATIONS

Written Opinion issued Aug. 17, 2021 in corresponding PCT Application No. PCT/CN2021/093637 (with English translation), 2 pages.
Chinese Office Action issued Nov. 26, 2021 in corresponding Chinese Patent Application No. 202010549121.7 (with English translation), 17 pages.
Chinese Notice of Allowance issued May 17, 2022 in corresponding Chinese Patent Application No. 202010549121.7 (with English translation), 8 pages.

* cited by examiner

FLEXIBLE DISPLAY DEVICE

CROSS-REFERENCE TO RELATED APPLICATIONS

The present disclosure is based upon International Application No. PCT/CN2021/093637 filed on May 13, 2021, which claims priority to Chinese Patent Application No. 202010549121.7, entitle "FLEXIBLE DISPLAY DEVICE" filed on Jun. 16, 2020, the entire contents thereof are incorporated herein by reference.

TECHNICAL FIELD

The present disclosure relates to the field of display technology, and in particular, to a flexible display device.

BACKGROUND

At present, a supporting member and a flexible display panel of a windable display panel with a single shaft are fixed together in both an unfolded state and a winding state. In the winding state, a bending radius of the flexible display panel is small at some positions, which makes the flexible display panel stress unevenly. This will lead to offset of each functional layer in the flexible display panel, and thus affects the display effect thereof.

SUMMARY

Embodiments of the present disclosure provide a flexible display device.

Additional aspects and advantages of the present disclosure will be set forth in part in the description that follows, and in part will be apparent from the description, or may be learned by practice of the present disclosure.

An aspect of the present disclosure provides a flexible display device, including:
  a housing, having an opening provided thereon;
  a winding shaft, rotatably provided in the housing;
  a flexible display panel, having one end connected to the winding shaft and another opposite end extending out of the housing through the opening;
  a supporting member, having one end connected to the winding shaft and another opposite end extending out of the housing through the opening;
  a separating member, provided on the housing to separate the flexible display panel and the supporting member partially when the flexible display panel and the supporting member are being wound up; and
  a pressing member, provided on the housing to connect the flexible display panel and the supporting member when the flexible display panel and the supporting part are being unwound.

In an exemplary embodiment of the present disclosure, the pressing member includes:
  a first pressing plate, provided at the opening and pressing against a surface of the supporting member away from the flexible display panel; and
  a second pressing plate, provided at the opening, arranged opposite to the first pressing plate, and pressing against a surface of the flexible display panel away from the supporting member.

In an exemplary embodiment of the present disclosure, the separating member is provided in the housing and between the flexible display panel and the supporting member, and a cross section of the separating member perpendicular to an axial direction of the winding shaft has a wedge shape with a sharp corner facing toward the opening.

In an exemplary embodiment of the present disclosure, the supporting member includes:
  a plurality of supporting plates, extending in an axial direction of the winding shaft and arranged in parallel; and
  a plurality of bonding layers, each adhered between two adjacent supporting plates.

In an exemplary embodiment of the present disclosure, a cross section of the supporting plate perpendicular to the axial direction of the winding shaft has an isosceles trapezoid shape, a side of the isosceles trapezoid shape close to the flexible display panel is shorter than a side of the isosceles trapezoid shape away from the flexible display panel, and the bonding layer is bonded to a surface of the supporting plate away from the flexible display panel.

In an exemplary embodiment of the present disclosure, a cross section of the supporting plate perpendicular to the axial direction of the winding shaft has a rectangular shape, and the bonding layer is provided at a surface of the supporting plate close to the flexible display panel.

In an exemplary embodiment of the present disclosure, the flexible display device further includes:
  two coil springs, each having one end connected to a shaft end of the winding shaft and another end connected to an inner wall of the housing.

In an exemplary embodiment of the present disclosure, the flexible display device further includes:
  an extension spring, having one end connected to the winding shaft and another end connected to the supporting member; and
  an inner retraction space is provided in the winding shaft, the extension spring is provided in the inner retraction space, and the end of the supporting member connected to the extension spring is provided in the inner retraction space.

In an exemplary embodiment of the present disclosure, the flexible display panel and the supporting member are connected by a mushroom head buckle, a suction cup, an adhesive layer or a van der Waals force.

In an exemplary embodiment of the present disclosure, the flexible display panel is bound with a flexible circuit board, the flexible circuit board is bound with a driving IC, a bracket is provided on the winding shaft, and the driving IC is fixed on the bracket, and the flexible circuit board is arranged along an inner cylinder wall of the winding shaft.

BRIEF DESCRIPTION OF THE DRAWINGS

The above and other features and advantages of the present disclosure will become more apparent from the detailed description of example embodiments thereof with reference to the accompanying drawings.

DETAILED DESCRIPTION

Example embodiments will now be described more fully with reference to the accompanying drawings. Example embodiments, however, may be embodied in various forms and should not be construed as limited to the embodiments set forth herein. Rather, these embodiments are provided so that the present disclosure will be thorough and complete, and the concept of example embodiments will be fully conveyed to those skilled in the art. The same reference numerals in the drawings denote the same or similar structures, and thus their detailed descriptions will be omitted.

Figure 1:
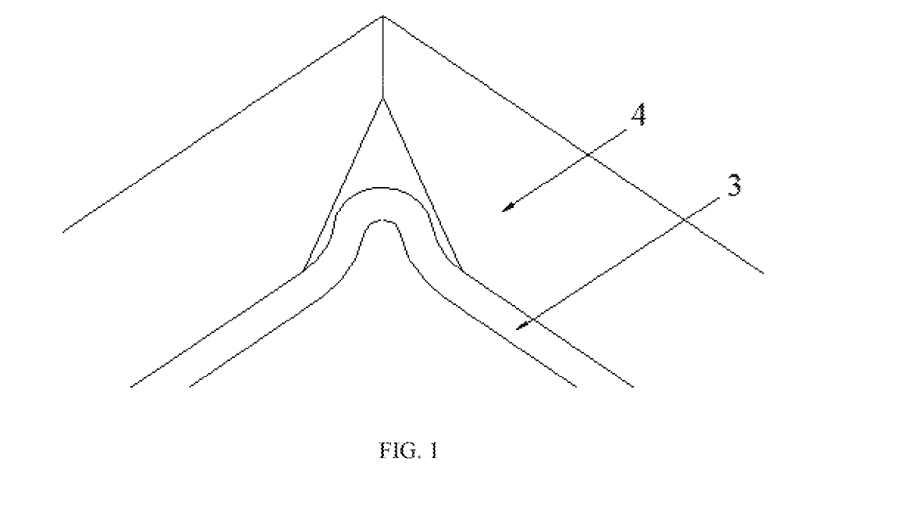
FIG. 1 is a schematic structural diagram of a flexible display device after being wound up in the related art.

Referring to FIG. 1, in the related art, a flexible display panel 3 and supporting members 4 are always fixed together After the flexible display panel 3 is wound up, the supporting members 4 would squeeze the flexible display panel 3 between the supporting members 4, which leads the squeezed flexible display panel 3 to have a large strain and stress, and thus causes a stress neutral layer of the flexible display panel 3 to offset. Therefore, a light-emitting layer is subject to a large stress and thus a display effect is ultimately affected.

Figure 2:
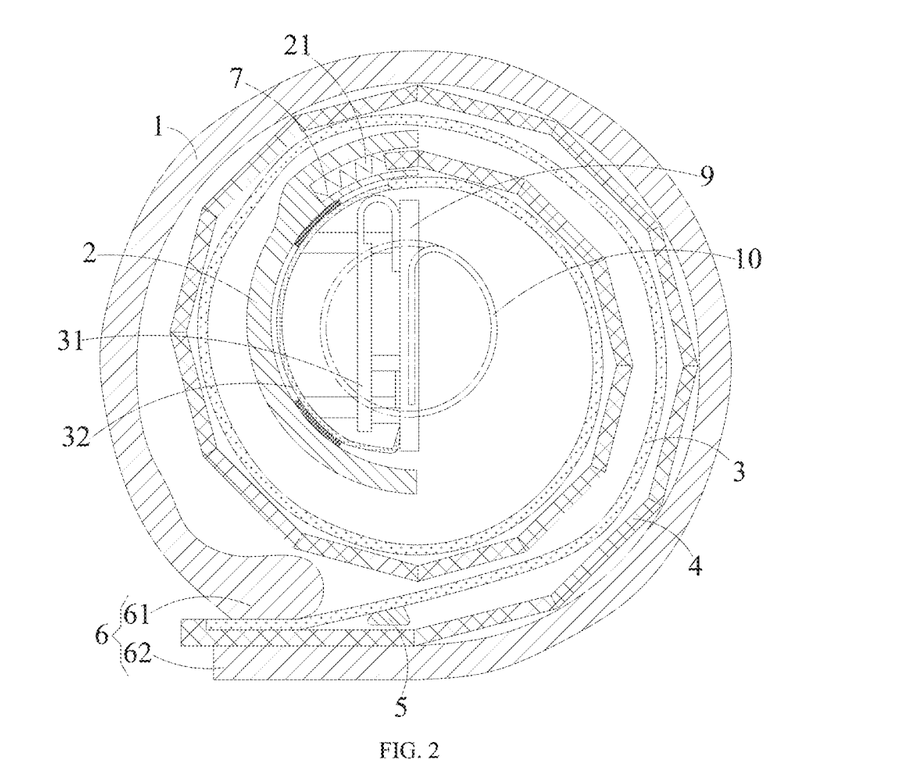
FIG. 2 is a schematic structural diagram of a flexible display device in a winding state according to an exemplary embodiment of the present disclosure.
Figure 3:
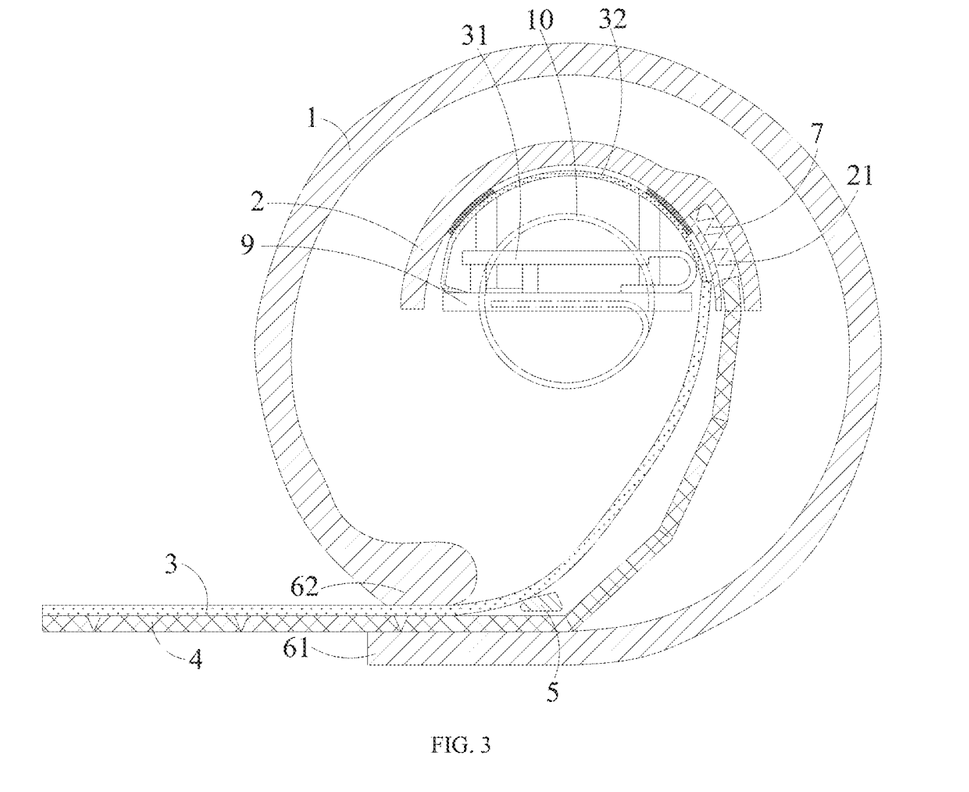
FIG. 3 is a schematic structural diagram of a flexible display device in an unfolded state according to an exemplary embodiment of the present disclosure.

An exemplary embodiment first provides a flexible display device. As shown in FIG. 2 and FIG. 3, the flexible display device may include a housing 1, a winding shaft 2, a flexible display panel 3, a supporting member 4, a separating member 5 and a pressing member 6. The housing 1 has an opening provided thereon. The winding shaft 2 is rotatably provided in the housing 1. The flexible display panel 3 has one end connected to the winding shaft 2 and another opposite end extending out of the housing 1 through the opening. The supporting member 4 has one end connected to the winding shaft 2 and another opposite end extending out of the housing 1 through the opening. The separating member 5 is provided on the housing 1 to separate the flexible display panel 3 and the supporting member 4 partially when the flexible display panel 3 and the supporting member 4 are being wound up. The pressing member 6 is provided on the housing 1 to connect the flexible display panel 3 and the supporting member 4 when the flexible display panel 3 and the supporting part 4 are being unwound.

The flexible display panel 3 and the supporting member 4 may be partially separated by the separating member 5 when the flexible display panel 3 and the supporting member 4 are being wound up. That is, the flexible display panel 3 and the supporting member 4 are separated at the side of the separating member 5 away from the opening, and the flexible display panel 3 and the supporting member 4 are still connected at the side near the opening of the separating member 5, so that the flexible display panel 3 and the supporting member 4 may be wound up respectively after being rolled up. The flexible display panel 3 may be wound up freely, and thus has a small radial pressure and axial tension and then a small stress. A stress concentration of the flexible display panel 3 would not be caused by a local step difference, which may prevent the functional layer in the flexible display panel 3 from offsetting due to uneven stress on the flexible display panel 3. Therefore, the display functional layer of the flexible display panel 3 may be adjusted conveniently to be a stress neutral layer, which protects the display functional layer and does not affect the display effect. The flexible display panel 3 and the supporting member 4 may be connected through the pressing member 6 when the flexible display panel 3 and the supporting member 4 are being unwound. That is, the flexible display panel 3 and the supporting member 4 are connected outside the housing. After the flexible display panel 3 and the supporting member 4 are unfolded, the supporting member 4 provides support for the flexible display panel 3 to realize flat display.

In an exemplary embodiment, the housing 1 may be configured as a cylindrical shape. The opening is provided on the cylindrical surface of the housing 1 in an axial direction of the housing 1. The opening has a width greater than a sum of a thickness of the flexible display panel 3 and a thickness of the supporting member 4. The opening has a length greater than a length of the supporting member 4, and the length of the supporting member 4 is greater than or equal to a length of the flexible display panel 3, so that the supporting member 4 and the flexible display panel 3 may be unfolded or rolled up through the opening smoothly. In addition, the housing 1 may also be configured as a square column or an elliptical column or the like.

In an exemplary embodiment, the pressing member 6 may include a first pressing plate 61 and a second pressing plate 62. The first pressing plate 61 is provided at the opening along the length direction of the opening, and the length of the first pressing plate 61 is equal to the length of the opening. The first pressing plate 61 is connected to the housing with a transitional arc. The second pressing plate 62 is provided at the opening along the length direction of the opening, and the length of the second pressing plate 62 is equal to the length of the opening. The second pressing plate 62 is connected to the housing with a transitional arc. The first pressing plate 61 presses against a surface of the supporting member 4 away from the flexible display panel 3. The surface of the first pressing plate 61 pressing against the supporting member 4 is provided with a flat surface. The second pressing plate 62 presses against a surface of the flexible display panel 3 away from the supporting member 4. The surface of the second pressing plate 62 pressing against the flexible display panel 3 is provided with a flat surface. The so-called pressing against is not only contact, but also there is pressure between two contact surfaces that pressing against each other. That is, the first pressing plate 61 is in contact with a surface of the supporting member 4, and the pressing plate 61 exerts pressure on the supporting member 4; and the second pressing plate 62 is in contact with a surface of the flexible display panel 3, and the second pressing plate 62 exerts pressure on the flexible display panel 3. The second pressing plate 62 is disposed opposite to the first pressing plate 61. A width of a gap between the second pressing plate 62 and the first pressing plate 61 is equal to or slightly smaller than a sum of the thickness of the flexible display panel 3 and the thickness of the supporting member 4, so that the first pressing plate 61 and the second pressing plate 62 may press the flexible display panel 3 and the supporting member 4, and then the flexible display panel 3 and the supporting member 4 may be pressed together into one body when being unfolded. It may be understood that in another exemplary embodiment of the present disclosure, the pressing member 6 may include a pressing plate and a scraper. The pressing plate may have the same structure as the first pressing plate 61. The scraper is provided at an opposite position of the pressing plate, and the scraper is provided at the opening. The cross section of the scraper may be provided with a tongue shape, and the scraper may include a material such as rubber, plastic and other materials with certain flexibility and elasticity.

In an exemplary embodiment, the separating member 5 is provided in the housing 1. The separating member 5 is provided in a long rod shape with one end connected to an inner wall of the housing 1 at one end of the housing 1 and the other end connected to the inner wall of the housing 1 at the other end of the housing 1. The separating member 5 is located between the flexible display panel 3 and the supporting member 4. A cross-section of the separating member 5 perpendicular to the axial direction of the winding shaft 2 has a wedge shape with a sharp corner facing toward the opening. The sharp corner may be provided with a rounded chamfer, to avoid scratches on the flexible display panel 3 and the supporting member 4 caused by the sharp corner. In another exemplary embodiment of the present disclosure, the separating member 5 may be provided in a plate shape, and a side of the plate contacting the flexible display panel 3 and the supporting member 4 is provided with a rounded chamfer.

In an exemplary embodiment, the supporting member 4 may include a plurality of supporting plates 41 and a plurality of bonding layers 42. The plurality of supporting plates 41 extend in the axial direction of the winding shaft 2 and are arranged in parallel. Each bonding layer 42 is adhered between two adjacent supporting plates 41, so that the plurality of supporting plates 41 may form a plane to support the flexible display panel 3. The supporting plate 41 is provided in a long strip shape. The length of the supporting plate 41 in the axial direction of the winding shaft 2 is the same as the length of the supporting member 4 in the axial direction of the winding shaft 2, and the sum of the widths of the plurality of supporting plates 41 is the width of the supporting member 4. It may define sizes of the supporting plate 41 and the supporting member 4 in the axial direction of the winding shaft 2 as the lengths thereof.

Figure 4:
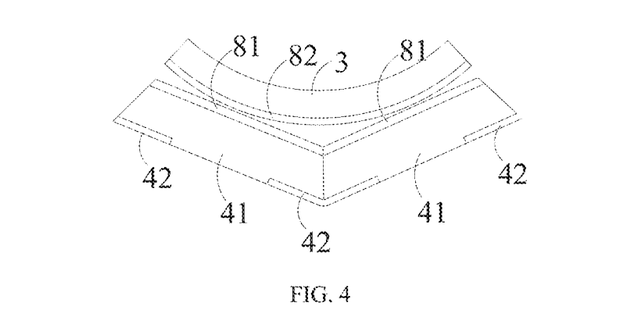
FIG. 4 is a partial structural schematic diagram of a supporting member and a flexible display panel in a winding state.
Figure 5:
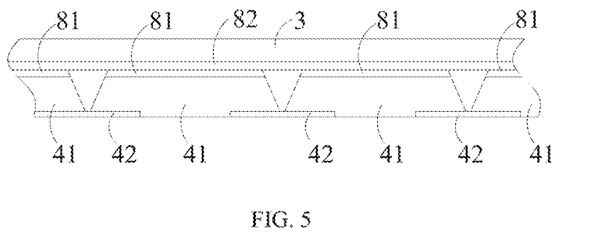
FIG. 5 is a partial structural schematic diagram of a supporting member and a flexible display panel in an unfolded state.

Referring to FIGS. 4 and 5, a cross section of the supporting plate 41 perpendicular to the axial direction of the winding shaft 2 has an isosceles trapezoid shape, and a side of the isosceles trapezoid shape close to the flexible display panel 3 is shorter than a side of the isosceles trapezoid shape away from the flexible display panel 3. The bonding layer 42 is bonded to a surface of the supporting plate 41 away from the flexible display panel 3. Specifically, concave portions are also provided in the surface of the supporting plate 41 away from the flexible display panel 3 at the two long sides of the supporting plate 41, the bonding layer 42 may be a black adhesive tape, and the black adhesive tape is adhered in the concave portion to connect two adjacent supporting plates 41 together.

Referring to FIG. 4, since the cross section of the supporting plate 41 has an isosceles trapezoid, after the supporting member 4 is separated from the flexible display panel 3, the supporting member 4 is wound up into a fixed shape under the constraint of the trapezoidal structure thereof. The flexible display panel 3 is freely wound up between the self-fixing supporting member 4, and the winding of the self-fixing support member 4 may protect the inner flexible display panel 3.

In an exemplary embodiment, the flexible display panel 3 and the supporting member 4 are bonded by a second adhesive layer 82 and a first adhesive layer 81 which have weak viscidity. The adhesive layer with weak viscidity may be repeatedly used for bonding. The first adhesive layer 81 and the second adhesive layer 82 may be bonded to each other when being pressed, and may be separated from each other after passing through the separating member 5. A microstructure which may generate van der Waals force may also be provided on a contact surface between the flexible display panel 3 and the supporting member 4, so that the flexible display panel 3 and the supporting member 4 may be bonded by the van der Waals force. Of course, the flexible display panel 3 and the supporting member 4 max also be connected by a mushroom head buckle, a suction cup and the like.

Referring to FIG. 5, after the supporting member 4 is unfolded, a plane is formed, the first adhesive layer 81 on the supporting member 4 and the second adhesive layer 82 on the flexible display panel 3 are bonded and connected into one body, and the supporting member 4 provides support for the flexible display panel 3, so that the flexible display panel 3 may display in a flat form.

Of course, the structure of the supporting member 4 is not limited to the above description. For example, the cross section of the supporting plate 41 perpendicular to the axial direction of the winding shaft 2 may have a rectangle shape, and the bonding layer 42 is provided on a surface of the supporting plate 41 close to the flexible display panel 3. Concave portions may be provided in the surface of the supporting plate 41 close to the flexible display panel 3 at the two long sides of the supporting plate 41. The bonding layer 42 may be a black adhesive tape, and the black adhesive tape is adhered in the concave portion to connect the adjacent two supporting plates 41 to each other. The thickness of the black adhesive tape may be the same as the depth of the concave portion, so as to provide a flat supporting surface for the flexible display panel 3.

In an exemplary embodiment, the winding shaft 2 may have a semi-cylinder shape, that is, the winding shaft 2 includes a semi-circular inner cylinder wall and a semi-circular outer cylinder wall, and two radial planes are connected between the inner cylinder wall and the outer cylinder waft End plates are provided at two shaft ends of the semi-cylinder shape, and the end plates are provided in a semi-circle or circle. A bracket 9 is provided in the semi-cylinder of the winding shaft 2, and a driving IC 31 is fixed on the bracket 9. The driving IC 31 is bound with the flexible circuit board 32, and the flexible circuit board 32 is arranged along the inner cylinder wall of the semi-cylinder. The flexible circuit board 32 is bound to the flexible display panel 3. The flexible display panel 3 and the supporting member 4 extend out of a same side of the semi-cylinder.

In an exemplary embodiment, the flexible display device further includes two coil springs 10 having one end connected to a shaft end (i.e., the central position of the end plate) of the winding shaft 2 and another end connected to an inner wall of the housing 1. When the supporting member 4 and the flexible display panel 3 are pulled outward with force, the supporting member 4 and the flexible display panel 3 are unfolded, and are bonded together under the pressing action of the pressing member 6. The supporting member 4 and the flexible display panel 3 drive the winding shaft 2 to rotate. The end of the coil spring 10 fixed to the housing 1 is fixed, and the end of the coil spring 10 fixed to the winding shaft 2 also rotates, so that the coil spring 10 is twisted and deformed. After the using of the flexible display panel 3, the supporting member 4 and the flexible display panel 3 are released, the coil spring 10 rotates back to the original state under the action of the torsion force, the coil spring 10 drives the winding shaft 2 to rotate in a reverse direction, and the winding shaft 2 drives the supporting member 4 and the flexible display panel 3 to rotate in the reverse direction. The supporting member 4 and the flexible display panel 3 are retracted into the housing 1. When entering the housing 1, the supporting member 4 is separated from the flexible display panel 3 under the separation action of the separating member 5, and the separated supporting member 4 and flexible display panel 3 are respectively wound up in the housing 1 to realize the rolling of the supporting member 4 and the flexible display panel 3.

In addition, the winding shaft 2 and the housing 1 may also be connected through a bearing, and a rotating shaft handle may be provided outside the housing. The rotating shaft handle is fixedly connected to the winding shaft 2. An operator drives the winding shaft 2 to rotate forward or reversely through the rotating shaft handle to realize the winding and unfolding of the supporting member 4 and the flexible display panel 3.

In an exemplary embodiment, the flexible display device may further include an extension spring 7 having one end connected to the winding shaft 2 and another end connected to the supporting member 4. The extension spring 7 may apply a pulling force all the time to pull the supporting member 4 into the housing. Specifically, an inner retraction space 21 is provided in the winding shaft 2. The inner retraction space 21 is provided in the cylinder wall of the semi-cylinder, and extends from the radial plane of the semi-cylinder into an arc shape along the circumference of the cylinder wall to match the supporting member 4 after being wound up. In addition, the thickness of the part, provided with the inner retraction space 21, of the cylinder wall of the winding shaft 2 is larger than that of the part thereof without the inner retraction space 21. The depth of the inner retraction space 21 is greater than the length of the tension spring 7, and the length of the inner retraction space 21 in the axial direction of the winding shaft 2 is greater than or equal to the length of the supporting member 4 in the axial direction of the winding shaft 2, so that the inner retraction space 21 may accommodate one end of the supporting member 4 therein. The tension spring 7 is provided in the inner retraction space 21, one end of the tension spring 7 is fixed to the bottom of the inner retraction space 21, the other end of the tension spring 7 is fixed to one end of the supporting member 4, and the end of the supporting member 4 connected to the tension spring 7 is provided in the inner retraction space 21. After the flexible display device is unfolded, the longer portion of the supporting member 4 may extend into the inner retraction space 21.

The features, structures or characteristics described above may be combined in any suitable manner in one or more embodiments and, where possible, the features discussed in the various embodiments are interchangeable. In the above description, numerous specific details are provided in order to give a thorough understanding of the embodiments of the present disclosure. However, those skilled in the art will appreciate that the technical solutions of the present disclosure may be practiced without one or more of the specific details, or with other methods, components, materials, and the like. In other instances, well-known structures, materials, or operations are not shown or described in detail to avoid obscuring aspects of the present disclosure.

Although relative terms such as "upper" and "lower" are used in this specification to describe the relative relationship of one component to another component shown, these terms are used in this specification only for convenience of description, for example, according to the example direction shown in the drawings. It will be appreciated that if the device shown is turned upside down, the component described as "upper" will become the component described as "lower". When a certain structure is "on" another structure, it may mean that the certain structure is integrally formed on said another structure, or that the certain structure is "directly" arranged on said other structure, or that the certain structure is "indirectly" arranged on said another structure through an additional structure.

In this specification, the terms "a", "an", "the" and "said" are used to indicate the presence of one or more elements/components/etc.; the terms "comprising", "including" and "having" are used for indicating an open-ended inclusive meaning and means that additional elements/components/etc. may be present in addition to the listed elements/components/etc.; the terms "first", "second" and "third", etc. are used only as markers not as restrictions on the number of objects.

It should be understood that the present disclosure does not limit the application thereof to the detailed structure and arrangement of components set forth in this specification. The present disclosure may have other embodiments and may be implemented and carried out in various ways. The foregoing variations and modifications fall within the scope of the present disclosure. It will be understood that the present disclosure disclosed and defined in this specification extends to all alternative combinations of two or more of the individual features mentioned or apparent in the text and/or drawings. All of these different combinations constitute various alternative aspects of the present disclosure. The embodiments described in this specification illustrate the best mode known for carrying out the present disclosure, and will enable those skilled in the art to utilize the present disclosure,

What is claimed is:

1. A flexible display device, comprising:
   a housing, having an opening provided thereon;
   a winding shaft, rotatably provided in the housing;
   a flexible display panel, having one end connected to the winding shaft and another opposite end extending out of the housing through the opening;
   a supporting member, having one end connected to the winding shaft and another opposite end extending out of the housing through the opening;
   a separating member, provided on the housing to separate the flexible display panel and the supporting member partially when the flexible display panel and the supporting member are being wound up; and
   a pressing member, provided on the housing to connect the flexible display panel and the supporting member when the flexible display panel and the supporting member are being unwound,
   wherein the supporting member comprises:
   a plurality of supporting plates, extending in an axial direction of the winding shaft and arranged in parallel; and
   a plurality of bonding layers, each adhered between two adjacent supporting plates of the plurality of supporting plates.

2. The flexible display device according to claim 1, wherein the pressing member comprises:
   a first pressing plate, provided at the opening and pressing against a surface of the supporting member away from the flexible display panel; and
   a second pressing plate, provided at the opening, arranged opposite to the first pressing plate, and pressing against a surface of the flexible display panel away from the supporting member.

3. The flexible display device according to claim 1, wherein the separating member is provided in the housing and between the flexible display panel and the supporting member, and a cross section of the separating member perpendicular to an axial direction of the winding shaft has a wedge shape with a sharp corner facing toward the opening.

4. The flexible display device according to claim 1, wherein a cross section of one of the supporting plates perpendicular to the axial direction of the winding shaft has an isosceles trapezoid shape,
a side of the isosceles trapezoid shape close to the flexible display panel is shorter than a side of the isosceles trapezoid shape away from the flexible display panel, and
one of the bonding layers is bonded to a surface of one of the supporting plates away from the flexible display panel.

5. The flexible display device according to claim 1, wherein a cross section of one of the supporting plates perpendicular to the axial direction of the winding shaft has a rectangular shape, and
one of the bonding layers is provided at a surface of one of the supporting plates close to the flexible display panel.

6. The flexible display device according to claim 1, further comprising:
two coil springs, each having one end connected to a shaft end of the winding shaft and another end connected to an inner wall of the housing.

7. The flexible display device according to claim 1, further comprising:
an extension spring, having one end connected to the winding shaft and another end connected to the supporting member; and
wherein an inner retraction space is provided in the winding shaft, the extension spring is provided in the inner retraction space, and an end of the supporting member connected to the extension spring is provided in the inner retraction space.

8. The flexible display device according to claim 1, wherein the flexible display panel and the supporting member are connected by a mushroom head buckle, a suction cup, an adhesive layer or a van der Waals force.

9. The flexible display device according to claim 1, wherein the flexible display panel is bound with a flexible circuit board, the flexible circuit board is bound with a driving IC, a bracket is provided on the winding shaft, and the driving IC is fixed on the bracket, and the flexible circuit board is arranged along an inner cylinder wall of the winding shaft.

10. The flexible display device according to claim 2, wherein there is a gap between the first pressing plate and the second pressing plate, and a width of the gap is equal to or smaller than a sum of a thickness of the flexible display panel and a thickness of the supporting member.

11. The flexible display device according to claim 3, wherein the separating member has a rod shape extending in the axial direction of the winding shaft, and the rod shape has two ends respectively connected to an inner wall of the housing at two opposite sides of the housing.

12. The flexible display device according to claim 4, wherein concave portions are provided in a surface of one of the supporting plates away from the flexible display panel at two sides of said one of the supporting plates, and each of the bonding layers is provided in two adjacent concave portions of two adjacent supporting plates of the plurality of supporting plates.

13. A flexible display device, comprising:
a housing, having an opening provided thereon;
a winding shaft, rotatably provided in the housing;
a flexible display panel, having one end connected to the winding shaft and another opposite end extending out of the housing through the opening;
a supporting member, having one end connected to the winding shaft and another opposite end extending out of the housing through the opening;
a separating member, provided on the housing to separate the flexible display panel and the supporting member partially when the flexible display panel and the supporting member are being wound up; and
a pressing member, provided on the housing to connect the flexible display panel and the supporting member when the flexible display panel and the supporting member are being unwound,
wherein the flexible display device further comprises:
two coil springs, each having one end connected to a shaft end of the winding shaft and another end connected to an inner wall of the housing.

14. The flexible display device according to claim 13, wherein the pressing member comprises:
a first pressing plate, provided at the opening and pressing against a surface of the supporting member away from the flexible display panel; and
a second pressing plate, provided at the opening, arranged opposite to the first pressing plate, and pressing against a surface of the flexible display panel away from the supporting member.

15. The flexible display device according to claim 13, wherein the separating member is provided in the housing and between the flexible display panel and the supporting member, and
a cross section of the separating member perpendicular to an axial direction of the winding shaft has a wedge shape with a sharp corner facing toward the opening.

16. The flexible display device according to claim 13, further comprising:
an extension spring, having one end connected to the winding shaft and another end connected to the supporting member; and
wherein an inner retraction space is provided in the winding shaft, the extension spring is provided in the inner retraction space, and an end of the supporting member connected to the extension spring is provided in the inner retraction space.

17. A flexible display device, comprising:
a housing, having an opening provided thereon;
a winding shaft, rotatably provided in the housing;
a flexible display panel, having one end connected to the winding shaft and another opposite end extending out of the housing through the opening;
a supporting member, having one end connected to the winding shaft and another opposite end extending out of the housing through the opening,
a separating member, provided on the housing to separate the flexible display panel and the supporting member partially when the flexible display panel and the supporting member are being wound up; and
a pressing member, provided on the housing to connect the flexible display panel and the supporting member when the flexible display panel and the supporting member are being unwound,
wherein the flexible display device further comprises:
an extension spring, having one end connected to the winding shaft and another end connected to the supporting member; and
wherein an inner retraction space is provided in the winding shaft, the extension spring is provided in the inner retraction space, and an end of the supporting member connected to the extension spring is provided in the inner retraction space.

18. The flexible display device according to claim 17, wherein the pressing member comprises:
   a first pressing plate, provided at the opening and pressing against a surface of the supporting member away from the flexible display panel; and
   a second pressing plate, provided at the opening, arranged opposite to the first pressing plate, and pressing against a surface of the flexible display panel away from the supporting member.

19. The flexible display device according to claim 17, wherein the flexible display panel and the supporting member are connected by a mushroom head buckle, a suction cup, an adhesive layer or a van der Waals force.

20. The flexible display device according to claim 17, wherein the flexible display panel is bound with a flexible circuit board, the flexible circuit board is bound with a driving IC, a bracket is provided on the winding shaft, and the driving IC is fixed on the bracket, and the flexible circuit board is arranged along an inner cylinder wall of the winding shaft.

* * * * *